United States Patent [19]
Horne

[11] Patent Number: 5,109,158
[45] Date of Patent: Apr. 28, 1992

[54] STARING ARRAY IMAGING SYSTEMS AND IMAGING ARRAY DEVICES

[75] Inventor: Russell J. Horne, Cobham, United Kingdom

[73] Assignee: Philips Electronic and Associated Industries Limited, London, England

[21] Appl. No.: 947,515

[22] Filed: Dec. 18, 1986

[30] Foreign Application Priority Data

Dec. 20, 1985 [GB] United Kingdom ............... 8531497

[51] Int. Cl.⁵ ............................................. H04N 3/10
[52] U.S. Cl. .................................................. 250/332
[58] Field of Search ....................................... 250/332

[56] References Cited

U.S. PATENT DOCUMENTS 3,746,454 7/1973 Pace et al. ................... 250/332 X
4,114,037 9/1978 Westwood .

FOREIGN PATENT DOCUMENTS 083976 7/1983 European Pat. Off. .
115366 12/1986 European Pat. Off. .
WO83/01882 5/1983 PCT Int'l Appl. .
0819595 4/1981 U.S.S.R. .......................... 250/332
1471164 4/1977 United Kingdom .
1525562 9/1978 United Kingdom .
2000658 1/1979 United Kingdom .
1601146 10/1981 United Kingdom .
2114853 8/1983 United Kingdom .

OTHER PUBLICATIONS

Itoh et al., "HgCdTe Photoconductive Detector Array", IEEE, 1980, pp. 150–154.

Primary Examiner—Mark Hellner
Attorney, Agent, or Firm—Cushman, Darby & Cushman

[57] ABSTRACT

An imaging array device and staring array imaging system are described for generating signals in response to an image from a distant scene. The device comprises a plurality of discrete arrays (11) of photo-sensing elements (10), for example cadmium mercury telluride infrared detector elements. The discrete arrays (11) are arranged side-by-side to provide a large composite array. A corresponding plurality of lenses (110), preferably formed in a common body, is arranged side-by-side to provide a substantially continuous optical transmission plane which is located in front of the arrangement of discrete arrays (11) and through which the image from the scene is transmitted to the composite array of the elements (10). In the composite virtual image (FIG. 3) of the composite array as seen from in front of the arrangement of lenses (110), the center-to-center spacing D' of the elements (10a') facing each other from neighboring discrete arrays (11) appears to be approximately equal to the magnified center-to-center spacing d' of the elements (10') in these discrete arrays (11). By making various adjustments in the fabrication and arrangement of the lenses (110), the discrete arrays (11) and their elements (10), it is possible to compensate for various image distortions and other problems which can arise in such imaging systems. Other image transfer means may be used instead of lenses (110), for example wedge-shaped plates (FIG. 8) and arrays of optical fibres (FIG. 9).

15 Claims, 4 Drawing Sheets

STARING ARRAY IMAGING SYSTEMS AND IMAGING ARRAY DEVICES

BACKGROUND OF THE INVENTION

This invention relates to staring array imaging systems comprising array devices which generate signals in response to an image from a distant scene, particularly but not exclusively for infrared imaging with arrays of, for example, cadmium mercury telluride photo-sensing elements. The invention further relates to imaging array devices.

In order to obtain large linear arrays, it is known to form such a device with a plurality of discrete arrays of the photo-sensing elements, the discrete arrays being arranged beside each other to provide a large composite array. One such arrangement comprising a linear array of 200 elements is described in, for example, IEEE Transactions on Electron Devices, Vol. ED-27, No. 1, January 1980, pages 150 to 154. Each discrete array of 50 cadmium mercury telluride elements is formed on its own sapphire substrate. Each of these detector elements is a separate body which is 75 $\mu$m (micrometres) wide, and neighbouring element bodies are spaced apart by gaps of 75 $\mu$m so that the centre-to-centre spacing of these elements is 150 $\mu$m.

In order to maintain this same centre-to-centre spacing for the end elements facing each other from neighbouring discrete arrays, these end elements are formed at only a half of the gap spacing (i.e. 37.5 $\mu$m) from the butting edges of substrates. Careful precautions are required in the fabrication of the elements to avoid performance degradation for these end elements situated close to the substrate edge.

Although the present applicants are able to form high performance end elements even closer to the butting edges of substrates or array bodies, there are situations where it is necessary or even desirable to arrange the discrete arrays in a spaced relationship. Thus, for example, very closely packed 2-dimensional arrays of elements can be formed in a common body of infrared sensitive material using the technology disclosed in published United Kingdom patent application (GB-A) 2,095,905, with no gaps between the elements. It is difficult to butt such discrete body arrays in 2 dimensions, particularly where a common connection is made to the edge of the body. Furthermore, it is usual to retain around the edge of the array body a width of the radiation-sensitive material which is larger than the centre-to-centre spacing of the elements, particularly when this spacing is very small. Thus, even if such body arrays were satisfactorily butted, the centre-to-centre spacing of the elements facing each other from neighbouring body arrays would be larger than that of the elements within these arrays.

It is often desirable to mount such a discrete array on a semiconductor substrate comprising signal processing circuitry. Although two or more body arrays may be butted together on the same circuit substrate, there is a practical manufacturing limit on the maximum area of a circuit substrate and this determines a maximum number of body arrays for a single circuit substrate. With very closely packed arrays, the area of the substrate needed to accommodate all the desired circuit elements and connections for one body array may be larger than that array, as a result of which the discrete arrays would be spaced from each other even if the circuit substrates were butted together. Furthermore it is exceedingly difficult to butt together such circuit substrates satisfactorily, particularly in 2 dimensions, while making all the required circuit connections between the discrete substrates.

In order to avoid butting array substrates or bodies, it is known from published United Kingdom patent application (GB-A) 2,000,658 to arrange linear arrays of photosensing elements 9 in a line in two separate series. The arrays are so spaced along each line as to have between adjacent arrays in the line a non sensitive, non image-forming space 5 having the same width in the direction of the line as the photosensitive length 8 of the linear array. The imaging system has two objectives in the form of projection lenses 2 and 3 arranged side by side with parallel optical axes so as to project identical images of a strip from a distant scene G onto both the lines B and B' of arrays. By a lateral shift in the arrangement of arrays in each line, it is arranged that the non image-forming spaces 5 between arrays of one line (B) for a given point of the scene viewed by one lens (2) corresponds to the photosensitive lengths 8 of the arrays of the other line (B') for the same scene point as seen by the other lens (3), and vice versa. As mentioned in GB-A 2,000,658, such an imaging system may be used in a camera for obtaining strip photographs or video line pictures taken from high altitudes, from satellites and/or in astronomy.

However, such projection lenses to avoid array-butting and to eliminate the effect of non image-forming spaces between arrays are not suggested for 2-dimensional arrays, and they do not seem to be usable with a plurality of arrays arranged in 2 dimensions to form a large 2-dimensional composite array such as desired for staring array imaging systems viewing a 2-dimensional scene. Such an extension of the teaching in GB-A 2,000,658 to a 2-dimensional arrangement currently seems to be impractical, as regards the side-by-side arrangement of projection lenses and the image crosstalk of various parts of a 2-dimensional scene becoming confused in the real images of the scene projected by the lenses onto the arrays.

Without necessitating butting of array substrates or bodies, the present invention permits 2-dimensional formation of large composite arrays of photo-sensing elements which are suitable for use in staring array imaging systems and in which the centre-to-centre spacing of the elements facing each other from neighbouring discrete arrays is, when viewed from the front, approximately equal to that of the elements in these discrete arrays. This is accomplished by providing each array with an image transfer or redirecting means forming a virtual image, particularly but not exclusively a magnifying lens.

According to one aspect of the present invention there is provided a staring array imaging system comprising an imaging array device which generates signals in response to an image from a distant scene, and an imaging objective from which the image of the distant scene is projected onto the device, wherein the device comprises a plurality of discrete arrays of photo-sensing elements, each discrete array is a 2-dimensional array of the photo-sensing elements, the plurality of discrete arrays are arranged in 2 dimensions to provide a large composite array, a corresponding plurality of image transfer means are arranged side-by-side in 2 dimensions in front of the discrete arrays to form a substantially continuous optical transmission plane through which the image projected from the objective is transmitted to the discrete arrays, each of the image transfer means being such as to form a virtual image of its respective discrete array as viewed from the objective and being so arranged in the transmission plane in relation to its discrete array that, in the composite virtual image of the composite array as viewed from the objective, the centre-to-centre spacing of the elements facing each other from neighbouring discrete arrays appears to be approximately equal to that of the elements in these discrete arrays.

The invention thus provides for such a system, an imaging array device which generates signals in response to an image from a distant scene, the device comprising a plurality of discrete arrays of photo-sensing elements, the discrete arrays being arranged to provide a large composite array, characterised in that image transfer means are located in front of the arrangement of discrete arrays to form a substantially continuous optical transmission plane through which the image from the scene is transmitted to the composite array of the elements, the image transfer means being so arranged in relation to each discrete array that, in the composite virtual image of the composite array as seen from in front of the image transfer means, the centre-to-centre spacing of the elements facing each other from neighbouring discrete arrays appears to be approximately equal to that of the elements in these discrete arrays.

According to another aspect of the invention, there is provided an imaging array device comprising a plurality of discrete arrays of photo-sensing elements, the discrete arrays being arranged to provide a large composite array, characterised in that a corresponding plurality of lenses is side-by-side to form a substantially continuous optical transmission plane which is located in front of the arrangement of discrete arrays and through which the image from the scene is transmitted to the composite array of the elements, each lens having such a magnification in relation to its discrete array that, in the composite virtual image of the composite array as seen from in front of the arrangement of lenses, the centre-to-centre spacing of the elements facing each other from neighbouring discrete arrays appears to be approximately equal to the magnified centre-to-centre spacing of the elements in these discrete arrays.

It should be noted that the segmentation of an optical plate to form individual magnifying lenses one for each of the individual photosensing elements of an array is known from published United Kingdom patent specification (GB-A)- 1,525,562, both for linear arrays and for 2dimensional arrays. By having one magnifying lens per photosensitive element, the area of that element "looks", to the incident radiation, to be larger than it actually is. The lens redirects the radiation from one scene pixel so that it all falls on the sensitive area of the element without any significant loss to the non-sensitive areas between the elements of the array. However, such an arrangement of magnifying lenses does not assist in obviating problems in assembling a plurality of discrete arrays to form a large composite array which "looks", to the incident radiation, as though the centre-to-centre spacing of the elements facing each from neighbouring discrete arrays is approximately equal to the magnified centre-to-centre spacing of the elements in these discrete arrays. Such a situation is achieved in accordance with the present invention by providing each discrete array with its own magnifying lens or other image transfer means in accordance with the invention.

Arrangements in accordance with the invention permit the assembly of spaced discrete arrays to form a very large composite array on which an image from the scene can be projected without encountering significant difference or discontinuity in the centre-to-centre spacing of the photo-sensing elements at the transition from one discrete array to the next discrete array. Thus, for example, when all the discrete arrays have the same centre-to-centre spacing of their elements, a large composite array having the same resolution throughout can be obtained. However, the composite array may have different resolution in different areas. Since the arrangement of lenses or other image transfer means forms a continuous transmission plane for the image of the scene, all of the scene being imaged can be viewed by the composite array. Depending on constructional features of the equipment comprising the device, the lens arrangement or other image transfer arrangement may be supported separate from or mounted on bodies or substrates comprising the discrete arrays; in the latter case, efficient image transmission can be obtained with optical immersion of the discrete arrays, and the arrays may support the image transfer means or the image transfer means may support the discrete arrays. As will be described later, various adjustments can be included in the fabrication and arrangement of the image transfer means, the discrete arrays and their elements to compensate at least partially for various image distortions which may occur in some imaging systems. For this purpose, the use and adjustment of the magnification of lenses as the image transfer means is particularly beneficial.

Such magnifying lenses or other image transfer means forming a virtual image of each array may be used with linear arrays of photo-sensing elements, but the invention is of particular advantage for forming large area composite arrays in two dimensions. Thus, preferably, each discrete array is a 2-dimensional array of photo-sensing elements, and the arrangement of both the discrete arrays and the lenses or other image transfer means may extend in 2 dimensions. The resulting device may be a staring array.

Thus, the present invention permits a staring array imaging system to be designed, comprising a 2-dimensional array device in accordance with the invention, and comprising an imaging objective from which an image of the distant scene is projected onto the device, the continuous optical transmission plane formed by said arrangement of lenses or other image transfer means being so located in relation to the image plane of the objective as to provide the focussed image from the scene on the photo-sensing elements.

Depending on its characteristics and angle of view, the objective may have an image plane which is curved. In this case the discrete arrays and/or their corresponding lenses or other image transfer means can be assembled and arranged so as to reduce or even to avoid image distortion. Thus, the continuous optical transmission plane formed by the arrangement of lenses or other image transfer means associated with the discrete arrays may be bent or curved similar to the curved image plane of the objective.

As will be described later, intermediate centre-to-centre spacing of elements may be provided in the fabrication of the elements approaching the facing edges of discrete arrays of different resolution. Even when composite arrays of the same resolution are formed, small adjustments may be desirable in the centre-to-centre spacing of particular elements as fabricated in the discrete arrays. Thus, for example, the elements within a discrete array may be arranged in a pattern which compensates for optical distortion of the image, for example by the objective or by the image transfer means associated with that discrete array.

Furthermore, as described later, the discrete arrays may be fabricated with more elements than are separately visible adjacent the array edges in any one angular view of the virtual image of that array as magnified. The use of such a large magnification as to superimpose, in the virtual image, the images of edge-adjacent elements of neighbouring arrays can be particularly beneficial for wide angle rays from the scene, especially those incident on peripheral arrays away from the centre of a very large composite array.

These and other features in accordance with the present invention will now be illustrated further in the description of specific embodiments, given by way of example, with reference to the accompanying diagrammatic drawings in which:

DESCRIPTION OF THE PREFERRED EMBODIMENT

Figure 1:
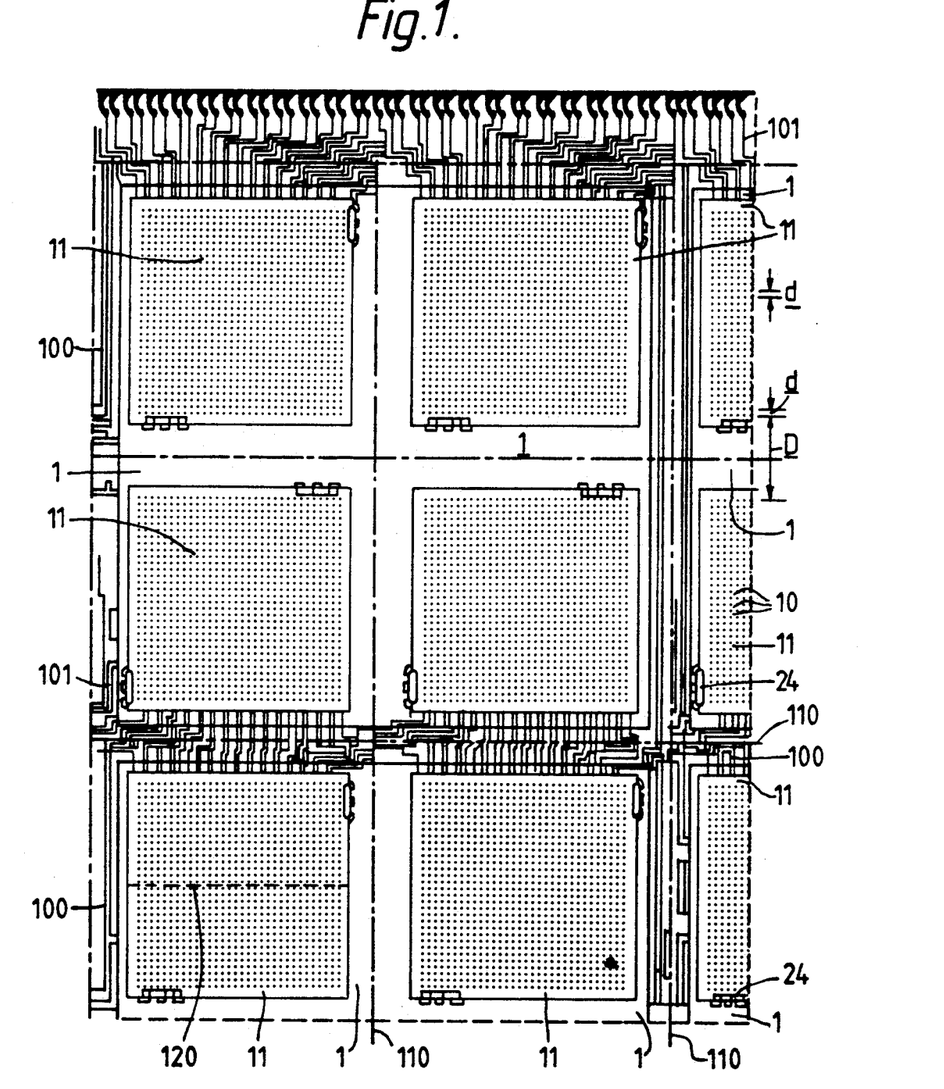
FIG. 1 is a plan view of an assembly of discrete arrays of photo-sensing elements having a lens arrangement and forming part of a device in accordance with the present invention.

The drawings are diagrammatic and not drawn to scale. The dimensions and proportions of parts of the Figures have been exaggerated or diminished for the sake of convenience and clarity in the drawings. For the same reason, several features have been shown in simplified form. Thus, only a few of the elements across an array 11 are illustrated in, for example, FIG. 2. In general, the same reference signs as used in one embodiment are used in other embodiments to designate corresponding or similar parts. The imaging array device, of which part is illustrated in FIG. 1 and on the right-hand side of FIG. 2, comprises a plurality of discrete arrays 11 of photo-sensing elements 10. The discrete arrays 11 are arranged side-by-side in a spaced relationship to provide a large composite array. In this situation the centre-to-centre spacing D of the edge elements 10a (see, for example, FIG. 4) from neighbouring discrete arrays 11 is much larger than the centre-to-centre spacing d of the elements 10 in the arrays 11. As will be explained hereinafter part of D is sensitive area and part is non-sensitive area, i.e. so-called "dead" space.

In accordance with the present invention a corresponding plurality of lenses 110 is arranged side-by-side to form a continuous transmission plane which is located in front of the arrangement of discrete arrays 11 and through which an image from a distant scene is transmitted to the composite array. The outline of each lens is indicated by the chain-dot line 110 in FIGS. 1 and 3. Each lens 110 has such a magnification in relation to its own discrete array 11 that, in the composite virtual image (FIG. 3) of the composite array as seen from in front of the arrangement of lenses 110, the centre-to-centre spacing of the elements 10a facing each other from neighbouring arrays 11 appears to be reduced (as illustrated by D' in FIG. 3) by the lenses 110 so as to be approximately equal to the magnified centre-to-centre spacing (d') of the elements 10 in these discrete arrays 11.

Figure 3:
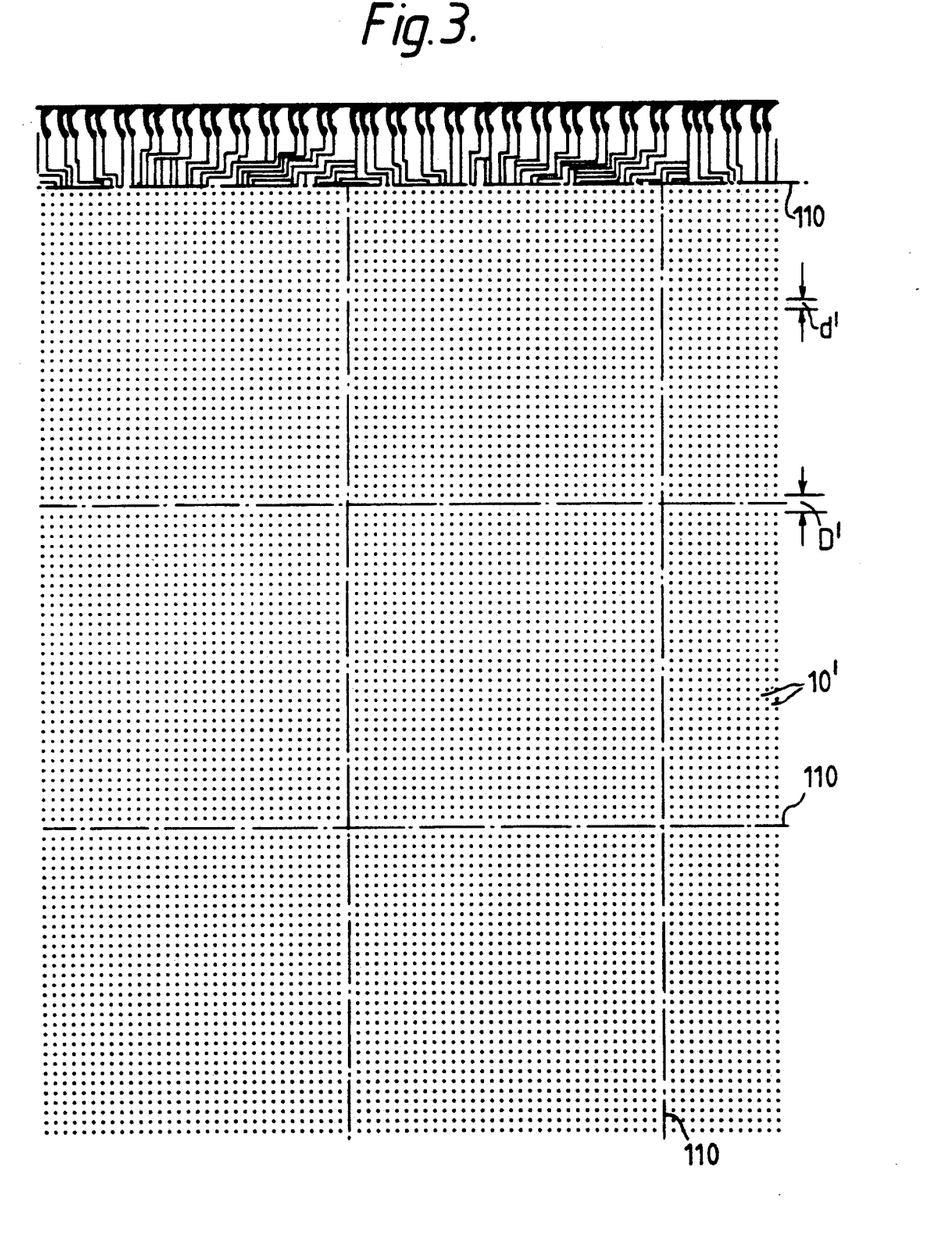
FIG. 3 is a plan view of the composite virtual image of the part of the composite array of FIG. 1 as seen from the objective lens.

When the discrete arrays 11 each have the same uniform centre-to-centre spacing d for all their elements 11, the large composite array as seen through the lenses 110 is uniform throughout (including at the transitions between discrete arrays 11, see FIG. 3) so that the image resolution in all parts of the composite array is substantially the same (d'). Thus, any particular object detected in the distant scene being viewed will look substantially the same (in terms of the pattern of elements 10 on which its image is incident) regardless of where it appears on the composite array.

Figure 2:
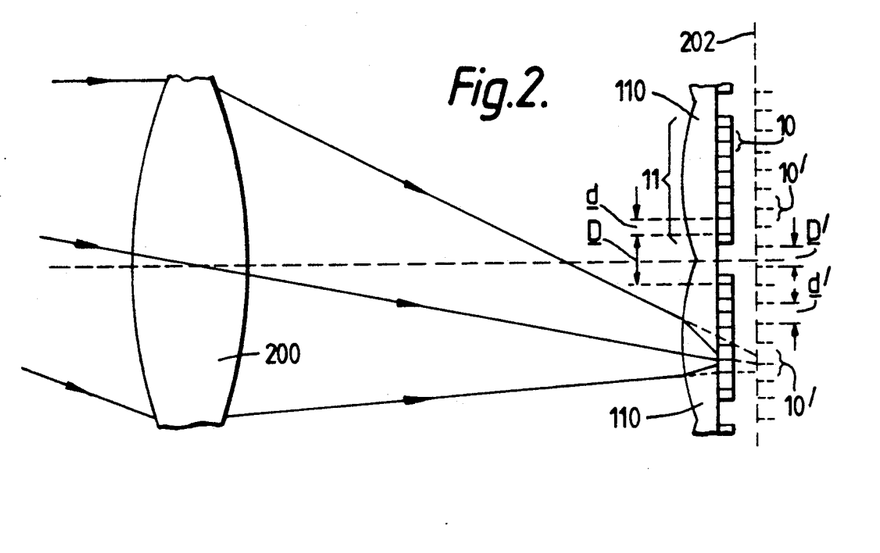
FIG. 2 is a sectional view of parts of the device structure of FIG. 1 together with an objective lens arranged in a staring array imaging system in accordance with the invention.

FIG. 2 illustrates how the imaging array device of FIG. 1 can be used in a staring array imaging system. The distant scene being viewed is not shown, being a long way off to the left. An image of the scene is projected from an imaging objective 200 onto the composite array of discrete arrays 11 via the lenses 110. The virtual image plane of the arrangement of lenses 110 is located at the image plane 202 of this objective 200 so that the lenses 110 transmit to the arrays 11 a sharp minified image of that projected by the objective 200. In FIG. 2, the virtual images 10' of the elements 10 in the image plane of the objective 200 as seen from the front of the lenses 110 have substantially the same centre-to-centre spacing at the transition between neighbouring arrays 11 as they do in each array 11. FIG. 2 illustrates the rays coming from one point of the scene which are projected onto one element 10 of one array 11.

Figure 5:
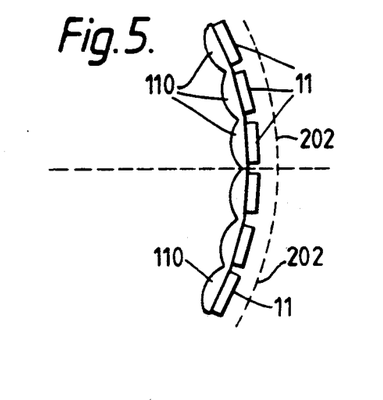
FIG. 5 is a sectional view of part of a device arrangement in accordance with the invention, for use in a system with a curved image plane.

The objective 200 may be of any known form, for example a compound lens arrangement with a diaphragm controlling the field of view. Although a lens 200 is represented in FIG. 2, the objective 200 may comprise a mirror arrangement. The system would be used most commonly for viewing such distant objects that, with a single objective 200, the image plane 202 is at the focal length of the objective 200. Although a substantially flat part of the plane 202 is shown in FIG. 2, the whole image plane 202 may be curved, particularly when the objective 200 is of large dimensions and has a wide angle of view. Such curvature of the plane 202 can become noticeable with very large area composite arrays. However, image distortion resulting from the curvature can be avoided by mounting the lenses 110 and discrete arrays 11 on a suitably shaped support so as to be located approximately in similarly curved planes. One such arrangement with part-spherical planes is illustrated in FIG. 5. In some imaging systems a complex projection system using image-relay optics or image-transfer optics may be adopted, in which case the lens 200 may be a secondary objective viewing a real image projected from a primary objective, and the image plane 202 of lens 200 would not be its focal plane.

It will be evident that optical filters will usually be incorporated into the imaging system to select particular wavelengths or wavelength bands at which the image from the scene is viewed by the photo-sensing elements 10. Thus, for example such filters may select infra-red radiation, for example in the 3 to 5μm or 8 to 14μm wavebands.

Figure 4:
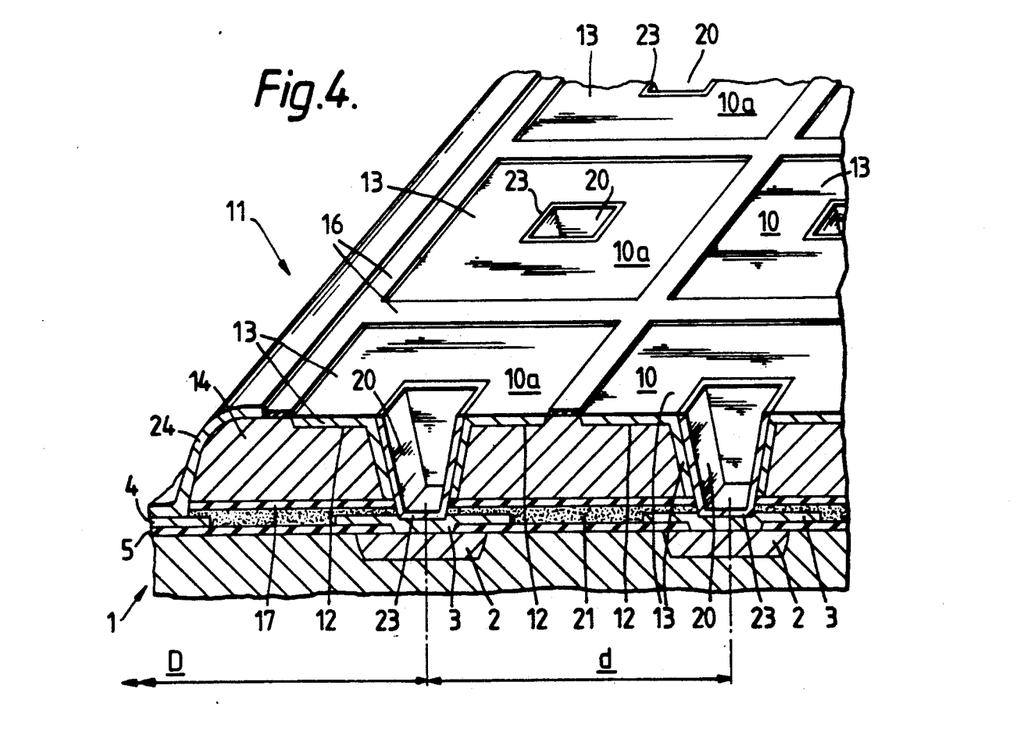
FIG. 4 is a part-sectional, part-perspective view of an edge of one possible form of discrete array for the device of FIG. 1.

The type of array 11 which is used depends on the type of application, and even for the same application quite different forms of arrays 11 are possible. By way of example, FIGS. 1 and 4 illustrate one particular form of 2-dimensional array in which the photo-sensing elements 10 respond to infrared radiation from the scene, the lenses 110 and the objective lens 200 being transmissive to this infrared radiation. In this particular form, each discrete array 11 is formed in a body of infrared sensitive material, for example cadmium mercury telluride, the bulk 14 of which is of p type conductivity. A 2-dimensional array of opposite conductivity type (n type) regions 13 are formed in the body to provide the infrared detector elements as photovoltaic p-n junction diodes. Each body array 11 is mounted on a substrate 1, for example of silicon, comprising a circuit for processing signals from the detector elements 10. The element regions 13 extend through the thickness of the array body around contact apertures 20 at the centre of each element 10. The elements 10 are connected to the signal-processing circuit in the substrate 1 via these apertures 20. There is a common connection to the p type bulk 14 by metallization 24 at the edge of the array body. This form of discrete array 11 is described in detail in GB-A 2,095,905, FIG. 1 of which is FIG. 4 of the present specification. The whole contents of GB-A 2,095,905 are hereby incorporated as a reference in the present specification so that a detailed description will not now be given.

By way of example, FIG. 1 illustrates a situation where groups of four such discrete arrays 11 are mounted on a common circuit substrate 1, and where the total composite array is formed by assembling groups of these circuit substrates 1 on an electrically insulating support 100. The supporting surface on which the substrates 1 are mounted side-by-side may be a flat plane, or it may be facetted to provide different mounting areas at progressively varying angles for different substrates 1 or groups of substrates 1 so that the orientation of the arrays 11 (and lenses 110) can approximate to a curved plane when the image plane 202 of the objective 200 is curved.

Connections between the circuits of the different substrates 1 may be formed as conductor tracks 101 extending on the support 100, possibly with interconnecting links extending over the edges of the substrates 1. However, a variety of different connection schemes are possible. The arrays 11 and circuit substrates 1 are so located on the support 100 that the centre-to-centre spacing of edge elements 10a from neighbouring discrete arrays 11 is constant, D. Although the discrete arrays 11 have been described as formed in individual bodies, it will be appreciated that, even in this particular form of the device, smaller bodies containing sub arrays may be butted together on a circuit substrate 1 to form a discrete array 11. Such a butted possibility is illustrated by the broken line 120 in FIG. 1.

The number of elements 10 in each discrete array 11 can be chosen according to the detector technology employed and the desired resolution. By way of example and simplicity in the drawing, FIG. 1 illustrates 32×32 elements arranged in a rectangular geometry so that each discrete array 11 has a square outline. The lenses 110 similarly have square outlines, but are wider than the arrays 11 so that the lenses adjoin one another to form a continuous optical transmission plane in front of the arrangement of arrays 11. Both the discrete arrays 11 and the lenses 110 extend in 2 dimensions to provide a large area device.

Elements 10 in a 32×32 discrete array 11 can be conveniently formed with both horizontal and vertical portions of the regions 13 as illustrated in FIG. 4. For very high resolution imaging it will usually be desirable to have more than 32×32 elements per discrete array 11; thus, in a particular example, each discrete array 11 may contain 128×128 elements 10 which may be fabricated with vertical annular regions 13 (as illustrated in FIG. 6 of GB-A 2,095,905) at a centre-to-centre spacing of 40 μm and contained in a body of, for example, 5.4 mm×5.4 mm. With these dimensions, the centre of the edge elements 10a is nearly 150 μm from the edge of the body so that there is an excess width of between 120 μm and 130 μm of infrared-sensitive material adjacent the edge of each discrete array 11. Such an excess width of the p-type sensitive material adjacent the edge of each array body can be particularly beneficial for discrete arrays 11 away from the centre of the composite array, as will be described later. Such array bodies may be arranged about 0.36 mm apart so that the centre-to-centre spacing D of edge elements 10a from neighbouring body arrays 11 is exactly 0.64 mm (640μm).

With these dimensions for an assembly of 128×128 element arrays 11, lenses 110 giving a magnification of 1.125 times may be used. With this arrangement, when viewed from the objective 200, each 128×128 array 11 will be magnified 1.125 times so that the centre-to-centre spacing d' of its elements 10 is 45 μm in the virtual image (FIG. 3) as seen from the objective 200. The centre-to-centre spacing D' of the edge elements 10a from neighbouring arrays 11 when seen from the objective 200 will appear to be reduced to approximately the same size i.e. 45 μm; this represents a 14 times reduction in the spacing D, which is achieved by incorporating these low magnification lenses 110. This reduction from D to D' is achieved because, within the angle of view from the objective 200, the lenses 110 do not form any image of almost all of the excess space between edge elements 10a from neighbouring arrays 11. This excess space consists of (i) non-sensitive areas of the circuit substrate 1 and/or insulating support 100 in the gaps between the arrays 11 and (ii) excess widths of infrared sensitive material adjacent the edges of the arrays 11.

If the composite array is viewed from a very wide angle, well outside the angle of view from the objective 200, the non-sensitive areas 1 and 100 will begin to appear in the composite virtual image at the transitions between the arrays 11; such a composite virtual image is no longer an image containing all 128×128 elements of each array 11 since at this very wide angle some of the elements will begin to disappear in the image of each array 11. Such a situation does not occur in imaging the distant scene to be viewed within the optical confines of the objective 200.

However, between the extremes in the field of view as determined by the objective 200, it will be appreciated that a slight shift can occur between how much of the excess width of infrared sensitive material adjacent the array edges is associated with the edge elements 10a in the virtual image (FIG. 3). When viewing the transitions between central arrays 11 from the optical axis of the objective 200, the centre-to-centre spacing of their edge elements 10a will take approximately equal areas from the sensitive edge widths of both neighbouring bodies, but the same transitions when viewed away from the optical axis, i.e. towards opposite extremes of the angle of view of the objective 200, will take more sensitive edge width from one body and less from the other. This can lead to slight cross-talk in edge elements 10a from neighbouring arrays 11 for the same image element from the scene. In addition to this sensitive-edge area shift at different angles, slight cross-talk can also occur in the edge elements 10a from neighbouring arrays 11 because the converging cone of light from a single point in the scene will split between the edges of neighbouring lenses 110 at the front surface of the composite arrangement of lenses 110. Thus, the proportion of the signal from any given point in the scene received by edge elements 10a of neighbouring arrays 11 will depend on the incident angle of the rays from that point.

Depending on the system application, such signal splitting and cross-talk may be acceptable without compensation. Otherwise it is possible to compensate at least partly by carrying out appropriate signal-processing in the circuit substrates 1, for example by combining at least part of the signals generated by these edge elements 10a from neighbouring arrays 11 so as to form a composite signal. Combination of these element signals permits an improved signal-to-noise ratio to be obtained for these edge elements 10a. In this situation it may be desirable to arrange for the centre-to-centre spacing D' of these edge elements 10a in the virtual image of FIG. 3 to be smaller than d'. However, the device arrangement will usually be such that any difference between D' and d' will not be greater than a factor of two, depending on the particular system application. Further features may be incorporated to facilitate compensation of cross-talk and other edge effects.

Figure 6:
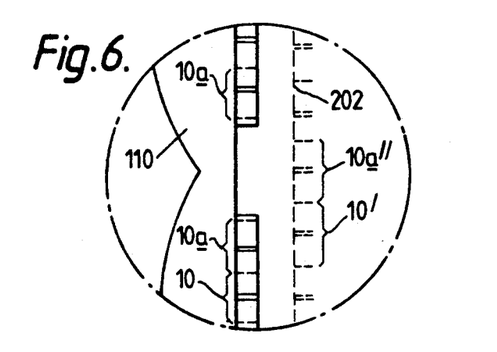
FIG. 6 is a side view of an edge transition part of the array and lens arrangement at the right-hand side of FIG. 2, with a slightly increased magnification.

As illustrated in FIG. 6, each lens 110 in relation to its discrete array 11 may be chosen to have a slightly larger magnification than previously described, the magnification being sufficiently large that the images of the elements 10a fabricated at (and also possibly those approaching) each edge of the array 11 are not separately visible in the composite virtual image, but are superimposed as indicated by image element 10a" in FIG. 6. The signals from the elements 10a whose images are superimposed are processed together to compensate at least partially for the cross-talk due to, for example, light cone convergence at the edges of the lenses 110. The magnification can be sufficiently large that, for example, only 120×120 elements 10 may be visible in the virtual image of a 128×128 array 11. When viewed from the optical axis the 120×120 element images 10' will not include the last four rows of elements 10 adjacent each edge of the array 11. However, at one extreme of the angle of view the 120×120 element images 10' will include the last four rows of elements at one edge of the array 11, and at the opposite extreme of the angle of view it will include the last four rows at the opposite edge of the array 11. However the system will be designed to avoid very wide angle rays which in an extreme situation could exceed the critical angle and so not be refracted by the lenses 110. The F number of the objective 200 will be of such a value that no significant proportion of rays will strike the lenses 110 in excess of the critical angle. Furthermore the path of rays between the lens surface and the arrays 11 for different ray angles is taken into consideration in the precise location of a lens 110 in front of its array 11. Curvature of the objective image plane 202 and the mounting planes of the lenses 110 and arrays 11 also affects the angles of incident rays.

Although discrete lenses 110 could be assembled edge-to-edge to form the continuous optical transmission plane in front of the arrays 11, it is preferable to avoid introducing unnecessary interface discontinuities within the composite lens arrangement which may interrupt or distort some of the light rays travelling at angles through the lens arrangement. Therefore, preferably the whole arrangement of the lenses 110 is formed integrally in a common body of transmissive material as illustrated in FIG. 2. Such a composite lens body may be formed in known manner with known materials; one example is by replica optic techniques with moulded plastics materials using a precisely-machined master. Although the composite body of lenses 110 may be spaced from the arrays 11, it is advantageous to provide intimate optical coupling between the arrays 11 and their lenses 110 to obtain optical immersion. Such optical immersion is illustrated in FIGS. 2 and 6, where the arrangement of lenses is shown attached to the front of the discrete arrays 11. Depending on the constructional details of the equipment comprising the device, the lenses 110 may be supported on the arrays 11, or the arrays 11 (and circuit substrates 1) may be supported on the lenses 110 if the latter are formed with sufficient material strength and an adequate mounting arrangement. Using the lenses 110 as the main structural support permits considerable variation in and simplification of any insulating support 100 for, for example, a conductor pattern between the circuit substrates 1.

Such lenses 110 having only a small magnification can be produced using known optic techniques with such good quality as to introduce little or no optical distortion of the image formed by the lens. However, if undesirable distortion does occur in a particular design of the lenses 110 or objective 200, the elements 1 within the discrete array or arrays which are affected can be arranged in a slightly non-regular pattern which at least partially compensates for the optical distortion introduced by the lenses 110 or other optics.

Figure 7:
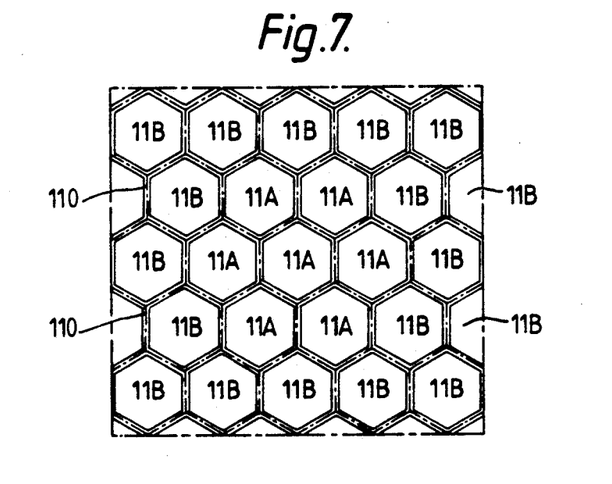
FIG. 7 is an arrangement of discrete arrays having two different resolutions for a device and system in accordance with the invention.

It is also possible to have different resolution in different parts of the composite image using discrete arrays 11 with different element densities. Such a situation is illustrated in FIG. 7, where the arrays 11 are of two types A and B. The discrete arrays 11A at the centre of the composite array are fabricated to have a smaller centre-to-centre spacing of their photo-sensing elements 10 and hence a higher resolution than the surrounding arrays 11B. Both arrays 11A and arrays 11B are of the same overall area but arrays 11A may have, for example, 512×512 elements 10 whereas arrays 11B may have, for example, 128×128 elements 10. In this case, the spacing d of elements in the type B arrays 11 will be 4 times that in the type A arrays 11. As seen in the composite virtual image, the centre-to-centre spacing D' of edge elements 10a facing each other from a type A array 11 and a type B array 11 can be intermediate in size between that of type A and that of type B, for example 2 times the spacing d' of type A and hence half the spacing d' of type B. This can be achieved by appropriately adjusting (during fabrication of the array) the spacing of those edge elements 10a which are adjacent an edge which is to face the other type of array 11 in the composite arrangement. Furthermore, similar adjustments can be made in the fabrication of these arrays to provide the intermediate spacing for more than one row of the elements within each array at a transition from a type A to a type B spacing; thus, for example approaching these type transitions there may be one or more rows of 256×256 elements. However instead of this graded arrangement, an abrupt transition may be provided between the different centre-to-centre spacings of the arrays 11A and 11B.

A rectangular 2-dimensional array geometry with square outlines has been illustrated in FIGS. 1 and 3. However other 2-dimensional array geometries may be used, for example hexagonal outlines for close-packed lenses 110 and also for close-packed spaced arrays 11. Such hexagonal outlines are illustrated for the arrays 11A and B in FIG. 7. The invention may also be used with an assembly of linear arrays 11 in which case, the lenses 110 for each array 11 may be cylindrical. Staggered arrays are also possible.

It will be evident that many other modifications are possible within the scope of the present invention. Instead of forming the discrete arrays 11 using the technology of GB-A 2,095,905 with an array of contact apertures 20 and annular regions 13, the elements 10 may be formed as an array of n type regions or mesas adjacent a major surface of a p type layer or body and connected to the circuit substrate by a corresponding array of indium bumps or other connections. Such a technology is well known for the design of infrared detector arrays, particularly in a p type layer of cadmium mercury telluride epitaxially grown on a cadmium telluride substrate. When such an arrangement is employed for a device in accordance with the present invention, the cadmium telluride substrate may be retained on the front of the discrete array 11; this same substrate may be shaped to form the lens 110 or some other form of the image transfer means on the front of the array 11, for example a wedge 310 in FIG. 8.

Figure 8:
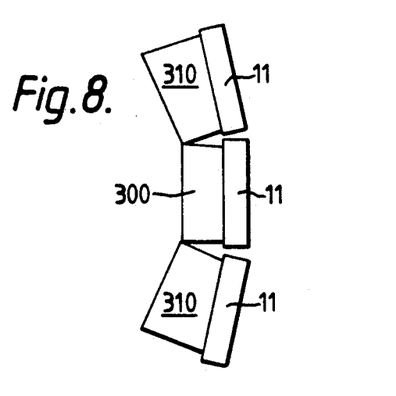
FIG. 8 is a side view of three discrete arrays with another type of image transfer means and forming part of an imaging array device and staring array system in accordance with the invention.
Figure 9:
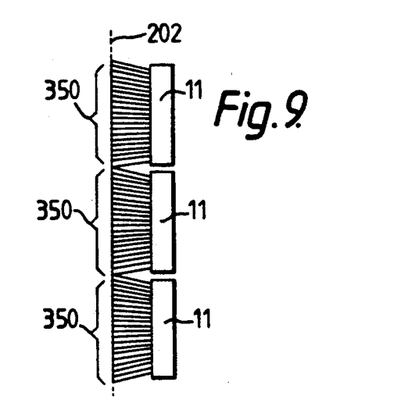
FIG. 9 is a side view of three discrete arrays with a further type of image transfer means and forming part of a further imaging array device and staring array system in accordance with the invention.

Instead of minifying/magnifying lenses 110, other forms of image transfer means may be used to obtain the desired centre-to-centre spacing of elements 10,10a. FIGS. 8 and 9 illustrate two different forms, both of which provide a substantially continuous optical transmission plane in front of the composite array and so located in relation to the image plane 202 of the objective 200 as to provide the focussed image from the scene on the photo-sensing elements 10. In FIG. 8, the image transfer means are a number of transmissive plates 300 and 310 arranged side-by-side, one plate for each discrete array 11. The centre plate 300 for the centre array 11 is parallel-sided, whereas the surrounding plates 310 are wedge-shaped to re-direct the transmitted image so splitting the total image from the scene between the discrete arrays 11. Although FIG. 8 illustrates the arrays 11 optically immersed on the plates 300 and 310, the plates 300 and 310 may be separated from the arrays 11 and may form, for example, windows of encapsulation packages for the arrays 11.

Instead of using such deflecting plates to split the image, FIG. 9 illustrates an arrangement in which the image transfer means for each discrete array 11 is an array 350 of optical fibres. In this case, each photo-sensing element 10 is optically immersed with its own optical fibre in the array 350. The front end of all the fibres is in the image plane 202 of the objective 200, and the centre-to-centre spacing of the fibres in this plane corresponds to the desired element spacing d',D' in the composite photo-sensing array. The optical fibres in their arrays 350 extend to the front of their associated discrete array 11 of photo-sensing elements 10 so transmitting the split image to the arrays 11. For this purpose, the fibres may be appropriately bent.

As described in page 1 line 116 to page 2 line 18 of GB-A 2,095,905, it is possible to form each photovoltaic element of cadmium mercury telluride in a separate body mounted on the circuit substrate 1, but this can introduce a significant non-sensitive gap between the detector elements 10. It is possible to eliminate the effect of such gaps between the elements by tapering the cross-section of each fibre in the fibre optic arrays 350 of FIG. 9. Thus, the cross-sectional area of each fibre may be wide in the continuous plane at the front face of the plurality of fibre arrays 350 and taper along its length to have at its back end a narrower cross-sectional area corresponding to the sensitive area of its associated detector element 10.

Although particular embodiments of the invention have been described with reference to infrared detector elements 10 of cadmium mercury telluride, it will be evident that the invention may be used with other photo-sensing element arrays 11, for example infrared detector arrays of lead tin telluride, indium antimonide, or even of pyroelectric and ferroelectric materials. Furthermore the photo-sensing elements 10 may be such as respond to wavelengths not in the infrared so that devices and systems in accordance with the present invention may operate for imaging with, for example, light wavelengths visible to the human eye.

From reading the present disclosure, other modifications will be apparent to persons skilled in the design and use of staring array imaging systems and imaging array devices and component parts thereof. Although claims have been formulated in this application to particular combinations of features, it should be understood that the scope of the disclosure of the present application also includes any novel feature or novel combination of features disclosed herein either explicitly or implicitly or any generalisation or modification of that feature or of one or more of those features which would be obvious to persons skilled in the art, whether or not it relates to the same invention as presently claimed in any claim. The applicants hereby reserve the right to formulate new claims to such features and/or combinations of such features during the prosecution of the present application or of any further application derived therefrom.

What I claim is:

1. A staring array imaging system comprising:
   an imaging array device for generating signals in response to an incident image; and
   an imaging objective for projecting an image of a distant scene onto the device;
   wherein said imaging array device comprises:

a composite array comprising a plurality of discrete 2-dimensional arrays of photo-sensing elements arranged in 2-dimensions such that the centre-to-centre spacing of the elements adjacent each other from neighbouring discrete arrays is greater than that of the elements within an individual one of the neighbouring discrete arrays; and a corresponding plurality of image transfer means located side-by-side in 2-dimensions in front of and in one-to-one correspondence with the discrete arrays to form a substantially continuous optical transmission plane through which the image projected by the objective is transmitted to the discrete arrays, each image transfer means forming a slightly magnified virtual image of the corresponding discrete array as viewed from the objective and being located in the transmission plane relative to the corresponding discrete array and to adjacent said image transfer means and corresponding discrete arrays so that in the composite virtual image of the composite array as viewed from the objective, the centre-to-centre spacing of elements adjacent each other from neighbouring discrete arrays appears to be approximately equal to that of the elements in the discrete arrays.

2. An imaging array device for generating signals in response to an incident image, said device comprising:
a plurality of discrete arrays of photo-sensing elements, said discrete arrays being arranged to form a composite array such that the centre-to-centre spacing of the elements adjacent each other from neighbouring discrete arrays is greater than that of the elements within an individual one of the neighbouring discrete arrays; and a corresponding plurality of lenses arranged side-by-side to provide a substantially continuous optical transmission plane which is located in front of the arrangement of discrete arrays to transmit the incident image to the composite array, each lens having a magnification in relation to its corresponding discrete array such that the arrangement of lenses forms a composite virtual image of the composite array as seen from the front of the arrangement of lenses, in which the centre-to-centre spacing of the elements adjacent each other from neighbouring discrete arrays appears to be approximately equal to the magnified centre-to-centre spacing of the elements in these discrete arrays.

3. A staring array imaging system as claimed in claim 1, wherein the image transfer means comprises a lens for each of the discrete arrays, each lens having a magnification in relation to its discrete array such that, in said composite virtual image of the composite array, the centre-to-centre spacing of the elements adjacent each other from neighbouring discrete arrays appears to be approximately equal to the magnified centre-to-centre spacing of the elements in these discrete arrays.

4. A staring array imaging system as claimed in claim 3, wherein the objective has a curved image plane, and the continuous optical transmission plane formed by said arrangement of lenses is bent or curved in a manner similar to that of the curved image plane of the objective.

5. A device as claimed in claim 2, further characterised in that each discrete array is a 2-dimensional array of photo-sensing elements, and that the arrangement of both the discrete arrays and the lenses extends in 2 dimensions to provide a large area device.

6. A device as claimed in claim 5, further characterised in that, in plan view, each of the discrete arrays and its associated lens is of square outline.

7. A device as claimed in claim 5, further characterised in that, in plan view, each of the discrete arrays and its associated lens is of hexagonal outline.

8. A system as claimed in claim 1, further comprising discrete arrays at the centre of the composite array having a smaller centre-to-centre spacing of their photo-sensing elements and hence a higher resolution than surrounding discrete arrays, and wherein the centre-to-centre spacing of elements adjacent each other from a central discrete array and from a surrounding discrete array is, as seen in said composite virtual image, intermediate in size between that in the central discrete array and that in the surrounding discrete array.

9. A system as claimed in claim 1, further characterised in that the elements within at least one discrete array are arranged in a pattern which compensates for optical distortion of the image transmitted to that discrete array.

10. A system as claimed in claim 1, further characterised in that, at least for discrete arrays away from the centre of the composite array, each associated image transfer means has a sufficiently large magnification in relation to its discrete array that, when viewed from in front, photo-sensing elements fabricated adjacent facing edges of the neighbouring discrete arrays are not separately visible but are superimposed in the virtual image of the composite array.

11. A system as claimed in claim 1, further characterised in that the front of each discrete array is attached to its associated image transfer means to provide optical immersion for the array.

12. A system as claimed in claim 1, further characterised in that the whole 2-dimensional arrangement of the image transfer means is formed integrally in a common body of transmissive material.

13. A system as claimed in claim 1, further characterised in that the photo-sensing elements respond to infrared radiation from the scene, the image transfer means being transmissive to this infrared radiation.

14. A system as claimed in claim 1, further characterised in that each discrete array is formed in a body of infrared sensitive material, that the bulk of the body is of opposite conductivity type to that of an array of regions of the body which provide the photo-sensing elements of that discrete array, and that, at least for discrete arrays away from the centre of the composite array, there is towards the edge of the body a width of the infrared sensitive material of said opposite conductivity type which is larger than the centre-to-centre spacing of elements fabricated in that body.

15. A system as claimed in claim 14, further characterised in that each body is mounted on a substrate comprising a signal-processing circuit, and that said regions formed in the body extend through the thickness of the body around contact apertures at the centre of the elements, via which contact apertures the elements are connected to the signal-processing circuit.

* * * * *